US007055717B1

(12) United States Patent
Koh

(10) Patent No.: US 7,055,717 B1
(45) Date of Patent: Jun. 6, 2006

(54) DISPOSABLE PILL DISPENSING CHUTE LINER

(76) Inventor: Ming S Koh, 5205 S. 232nd St., Kent, WA (US) 98032

( * ) Notice: Subject to any disclaimer, the term of this patent is extended or adjusted under 35 U.S.C. 154(b) by 0 days.

(21) Appl. No.: 10/852,719

(22) Filed: May 24, 2004

Related U.S. Application Data

(60) Provisional application No. 60/517,202, filed on Nov. 4, 2003.

(51) Int. Cl.
*B65G 59/00* (2006.01)

(52) U.S. Cl. .................... 221/294; 221/289; 53/284.5; 53/390

(58) Field of Classification Search ................ 141/331, 141/335, 336; 221/289, 294, 297; 53/390, 53/393, 284.5
See application file for complete search history.

(56) References Cited

U.S. PATENT DOCUMENTS

| | | | | |
|---|---|---|---|---|
| 1,113,648 | A * | 10/1914 | Karlson | 141/335 |
| 1,408,865 | A | 3/1922 | Cowell | |
| 2,006,036 | A | 6/1935 | Ware | |
| 2,435,033 | A | 1/1948 | Campbell | |
| 3,123,106 | A * | 3/1964 | Parhaniemi | 141/336 |
| 3,807,466 | A * | 4/1974 | Minneman | 141/332 |
| 3,976,219 | A * | 8/1976 | Pagnoni | 221/310 |
| 4,991,575 | A | 2/1991 | Fitz | |
| 5,121,779 | A | 6/1992 | Green | |
| 5,219,093 | A * | 6/1993 | Moulding et al. | 221/259 |
| 5,228,488 | A * | 7/1993 | Fletcher | 141/331 |
| 5,360,009 | A | 11/1994 | Herskovitz | |
| 5,502,944 | A | 4/1996 | Kraft et al. | |
| 5,651,481 | A | 7/1997 | Jensen | |
| 5,718,681 | A | 2/1998 | Manning | |
| 5,768,327 | A | 6/1998 | Pinto et al. | |
| 6,006,946 | A | 12/1999 | Williams et al. | |
| 6,152,281 | A * | 11/2000 | Bednarz et al. | 221/212 |
| 6,425,424 | B1 * | 7/2002 | Ellis Calvo et al. | 141/331 |
| 6,719,021 | B1 * | 4/2004 | Jwu | 141/331 |

FOREIGN PATENT DOCUMENTS

| | | |
|---|---|---|
| GB | 2.198.957 | 6/1988 |

* cited by examiner

*Primary Examiner*—Louis Huynh
(74) *Attorney, Agent, or Firm*—Michael I Kroll

(57) ABSTRACT

A pill dispensing device and method in which the part of the device 10 which comes into contact with the pills is disposable so as to prevent cross pill contamination. The device 10 is a disposable, columnar insert comprised of a funnel-like ingress aperture 16 for receiving the articles to be counted and dispensed, tapering to a constriction 18 to limit the passageway and diverging out to a cylindrical tube 20 that segregates the tablets/capsules from the counting/dispensing apparatus. The present invention 10 also provides for an additional element wherein the egress aperture 26 tapers to a smaller cylindrical aperture diametrically conforming to the aperture 18 at the opposing distal end for dispensing the medication directly into a vial 14.

5 Claims, 12 Drawing Sheets

DISPOSABLE PILL DISPENSING CHUTE LINER

RELATED APPLICATIONS

This application is subject to U.S. Provisional application Ser. No. 60/517,202, filed 4 Nov. 2003. Please incorporate by reference all information in said provisional application into this instant application.

BACKGROUND OF THE INVENTION

1. Field of the Invention

The present invention relates generally to health care and, more specifically, to a pill dispensing device and method in which the part of the device which comes into contact with the pills is disposable so as to prevent cross pill contamination.

The device is a disposable columnar insert comprised of a funnel-like ingress aperture for receiving the articles to be counted and dispensed, tapering to a constriction to limit the passageway and diverging out to a cylindrical tube that segregates the tablets/capsules from the counting/dispensing apparatus.

The present invention also provides for an additional element wherein the egress aperture tapers to a smaller cylindrical aperture diametrically conforming to an aperture at the opposing distal end for dispensing the medication directly into a vial.

Pharmacies commonly supply customers and patients with take home medication(s) in prescription vials for holding medication after their visits to the doctor's office. Whenever patients come to the pharmacies with their prescription scripts, they are sometimes in pain and want to take their medication(s) immediately according to the doctor's signa.

Note: Signa (Latin Word) is a term used in writing prescriptions meaning to label the subscription according to the dose, route of administration, and frequency of medication.

Ever since the birth of the pharmacy until now, the traditional tools used to fill the tablet/capsule prescription drug order(s) for the patient are basically the pill counting tray and the spatula. This is a time-consuming task for the pharmacy professionals to manually fill, count and dispense the medication drugs.

As technology has advanced, inventors have created several types of semi-automation and fully robotic automation dispensing systems to replace the traditional method of dispensing drugs. These automated systems have increased productivity and operational efficiency by increasing prescription volume while ensuring accuracy in the dispensing process. For example, U.S. Pat. No. 5,768,327 to Pinto, et al. discloses the objects (tablets/capsule prescription drugs in this case) placed on a feeding funnel, falling into a counting module, and being collected in a common removable tray, wherein the objects will ultimately be transferred into prescription vials. The entire process is repeated in filling all prescription order(s). The inventors did not disclose any drug cross contamination issues which can occur during filling, counting, and dispensing.

U.S. Pat. No. 6,006,946 to Williams, et al., discloses a similar invention, but does not emphasize the cross contamination of the pills that were discharged in a common chute at each cycle of filling and counting.

The above mentioned state-of-the-art semi-automation and robotic automation dispensing devices are now becoming the patients' top safety concern. The present invention is useful in helping to resolve the drug cross contamination problem in these new pharmacy environments.

Additional Issues and Concerns

The present invention also provides process improvement using the disposable chute liner on drug filling. The present invention protects against the potential cross contamination that generally occurs during filling, counting and dispensing of a medication, with the debris/dust of previously dispensed medications. Unlike other inventions (such as U.S. Pat. Nos. 4,018,358 and 5,897,024), this disposable chute liner will ensure that no debris/dust will be scattered in the surroundings during the filling process. All medications (the pill itself includes the debris/dust) using the disposable chute liner are dispensed directly into the patient's medication vial. After each filling of the medication is completed, the disposable chute liner will be discarded thereby preventing the potential for cross drug contamination.

Because of the improvement in the filling process, it is further claimed that using this invention of the disposable chute liner can greatly improve and reduce the potential for cross drug contamination. This resulting will ultimately help to resolve the unknown allergic symptoms caused by potential contamination in these new pharmacy environments.

2. Description of the Prior Art

There are other funnel-like device designed for restricting material flow. Typical of these is U.S. Pat. No. 1,408,865 issued to Cowell on Mar. 7, 1922.

Another patent was issued to Ware on Jun. 25, 1935 as U.S. Pat. No. 2,006,036. Yet another U.S. Pat. No. 2,435,033 was issued to Campbell on Jan. 27, 1948 and still yet another was issued on Apr. 19, 1977 to Johnson, et al. as U.S. Pat. No. 4,018,358 and another was issued on Feb. 12, 1991 to Fitz as U.S. Pat. No. 4,991,575.

Another patent was issued on Feb. 12, 1991 to Fitz as U.S. Pat. No. 4,991,575. Yet another was issued to Green on Jun. 16, 1992 as U.S. Pat. No. 5,121,779. Still yet another U.S. Pat. No. 5,360,009 was issued to Herskovitz on Nov. 1, 1994 and another was issued to Kraft, et al. on Apr. 2, 1996 as U.S. Pat. No. 5,502,944.

Another patent was issued on Jul. 29, 1997 to Jensen as U.S. Pat. No. 5,651,481. Yet another was issued to Manning on Feb. 17, 1998 as U.S. Pat. No. 5,718,681. Yet another U.S. Pat. No. 5,768,327 was issued to Pinto, et al. on Jun. 16, 1998 and still yet another was issued on Apr. 27, 1999 as U.S. Pat. No. 5,897,024 to Coughlin, et al. Another was issued to Williams, et al. on Dec. 28, 1999 as U.S. Pat. No. 6,006,946 and still yet another was issued on Jun. 29, 1988 to Brayshaw as U.K. Patent No. GB2198957.

U.S. Pat. No. 1,408,865

Inventor: Selden S. Cowell

Issued: Mar. 7, 1922

A collapsible funnel comprising an elongated tube, a sleeve slidable in the tube, a flexible funnel body of cloth material having its tapered end connected with said sleeve, and spring ribs secured to and extending the length of said funnel body having their lower terminals secured between the sleeve and the cloth of the body, said ribs having coil springs adjacent the jointure of the funnel body with said sleeve, the former will be moved to a flared or open position lichen withdrawn from said tube.

U.S. Pat. No. 2,006,036

Inventor: Herbert M. Ware

Issued: Jun. 25, 1935

Method of making a container body of longitudinal tapering form from paper or the like which consists in forming a sheet into the shape of the body, temporarily holding together the opposed longitudinal edges of the so formed sheet so that the interior of the body is left open and passing the body through a bath of proofing medium so that the latter enters the interior of the body and exerts pressure against the said opposed edges of the sheet so that when the proofing medium sets these edges are sealed together and permanency is imparted to the body.

U.S. Pat. No. 2,435,033

Inventor: James W. Campbell

Issued: Jan. 27, 1948

In an accessory adapted to act as a valve in a low pressure system, the combination of means for enclosing and conducting a fluid including a wall of a material to separate the enclosed fluid from a fluid exterior to said wall, said wall having a cavity having an axis substantially at right angles to said wall, and the orifice formed by the opening of said cavity having a non-wettable edge at the enclosed fluid side of said wall, said non-wettable edge of said orifice of said wall having a predetermined circumferential size, being determined by the force of the column of fluid above the orifice, of a height equal to the operational head and of cross-sectional area equal to that of the orifice, being equal to or less than the force developed by the surface tension acting on the non-wettable perimeter of the orifice, for bridging said orifice, for withholding said fluid through said cavity preventing egress of the same, but permitting intermittent ingress from the opposite end of said cavity of the other fluid at the other side of the wall to the non-wettable edge when the pressure of the ingress fluid becomes intermittently greater than the resisting forces of the withheld fluid at the orifice.

U.S. Pat. No. 4,018,358

Inventor: Robert D. Johnson, et al.

Issued: Apr. 19, 1977

Different types of pills are stored in separate cassettes which may be operated by a dispensing machine for dispensing from the cassette into a vial. The dispensing machine provides a vacuum supply and a drive for operating a wheel in the cassette having a series of openings annularly arranged to pick up pills in the bottom of the cassette and carry them to a discharge opening under the vacuum pressure. A separator wall extending across the line of travel of the holes carrying pills deflects the pills through the discharge opening. A gauge is adjustable to overlie a portion of the openings in the wheel to vary the opening size so that only a single pill is carried by each opening. A photoelectric cell triggered by a fiber optic scanner at the discharge opening counts each pill. An agitator turns with the conveying wheel to break up pills bridged together. A switch is utilized to set an electronic counter to the number of pills desired. This counter then successively counts down until it reaches zero at which point the machine stops.

U.S. Pat. No. 4,991,575

Inventor: Edward Fitz

Issued: Feb. 12, 1991

A mouthpiece assembly for a breathing apparatus comprising a housing, a disposable liner, and a protective sheath. The housing comprises a conical opening extending therethrough. The liner is conical and is adapted to be received in the housing. A seal is provided between the liner and the housing to prevent leakage of air. The liner includes a member for engaging the lips of the user when the mouthpiece is in use. The sheath is located between the housing and the liner. Additionally, the liner includes alignment members which are suitable for aligning the liner with the housing and for spacing adjacent liners when they are stacked.

U.S. Pat. No. 5,121,779

Inventor: John Green

Issued: Jun. 16, 1992

A funnel comprises a flat sheet of resilient flexible material and has interengaging formations on opposite sides of the sheet whereby the sheet may be rolled to funnel configuration and the interengaging portions detachably interengaged with each other to hold the sheet in funnel configuration. The interengaging portions are stamped from the material of the sheet, and can comprise a slot on one side of the sheet and a tongue on the other side of the sheet, the tongue being detachably receivable in said slot, or they can comprise slits cut in marginal portions of the sheet and extending in opposite directions from each other, the slits being engageable one within the other thereby releasably to retain the sheet in funnel configuration. The interengaging portions have substantially point contact with each other, whereby the sheet may be formed by manual pressure selectively into a funnel of variable conicity. The sheet has top and bottom edges, and between the top and bottom edges pairs of opposite side edges which, beginning with the top edge, converge in the direction of the bottom edge, then diverge in the direction of the bottom edge, and finally converge in the direction of the bottom edge, whereby the sheet is of generally arrowhead configuration having wings defined between the last two pairs of opposite edges, the interengaging structure being located in the wings.

U.S. Pat. No. 5,360,009

Inventor: Stuart Herskovitz

Issued: Nov. 1, 1994

A disposable spirometer mouthpiece comprises a resilient tubular member, having inner and outer surfaces and a defined wall thickness, the wall of the tubular member having first and second longitudinal zones of reduced thickness and thus reduced strength which allows the spirometer mouthpiece to be collapsed into a flat state for packaging and storage. Preferably, the tubular member is resilient, such that when released from a package, the resilience of the tubular member allows it to resume an essentially cylindrical shape for testing. After testing, the mouthpiece is disposed of and because of reduced zones of thickness, the mouthpiece is easily collapsed to its flat state by the weight of other waste to minimize disposal space.

U.S. Pat. No. 5,502,944

Inventor: Thomas L. Kraft

Issued: Apr. 2, 1996

A medication dispenser for use in a hospital or other medical setting comprises a plurality of containers for holding medication units, packaging apparatus for containing one or more medication units in a package and robotics for manipulating a selected container to transfer one or more medication units from the container directly to said package. Since medication is directly transferred from the container to the package, no cross-contamination occurs.

U.S. Pat. No. 5,651,481

Inventor: Brian Vang Jensen

Issued: Jul. 29, 1997

The invention relates to a drip-catcher for, for instance, a bottle and intended for preventing dripping and drops seeping from the bottle orifice during pouring. The drip-catcher of the invention simply consists of a piece of flexible and elastic foil material, preferably plastic material foil having the thickness of 0.1-0.2 mm. The diameter of the piece of material may be 60-80 mm. When used as a drip-catcher the piece of material is rolled into an oblong cylindrical form and inserted in the orifice of the bottle. Due to its elasticity the piece of material will positively engage the orifice and constitute a tube-formed outlet spout. Due to the small thickness of the foil material and its liquid-repellent nature this spout cuts off the jet very efficiently and is also a very efficient drop-catcher. The drip-catcher of the invention is extremely simple and cheap. Its use is uncomplicated and it is universally applicable because the piece of material adjusts itself to the bottle orifice irrespective of its size. The effect of the drip-catcher is remarkable due to the small thickness and liquid-repellent surface of the material.

U.S. Pat. No. 5,718,681

Inventor: Christopher E. Manning

Issued: Feb. 17, 1998

A medication delivery straw which delivers medication held within the straw tube. When the patient drinks fluid through the straw, the medication is dissolved and ingested by the patient. A particle barrier at one end of the straw prevents viscous or powdered medicines, or crushed tablets, from falling out of the straw. The particle barrier has apertures which allow fluid to enter the straw during use. The fluid dissolves the medication in the straw while the patient is drinking. Optional features include disposable funnels (which may be preloaded with medicine) for filling the straw with the correct dosage of medication, funnels which are capable of attaching to pill crushers, removable caps for straws with premeasured doses of medication that prevent medicine loss during handling or storage, flexible necks for ease of use, and flexible straw walls to allow crushing medicine tablets within the straw. In the alternative, a medicine sack holds the medication much like a teabag holds tea. The medicine sack is secured inside the fluid path of the straw and fluid passes through the walls of the medicine sack to dissolve the medication. Other embodiments use preloaded straws which may contain either crushable tablets or breakable cartridges.

U.S. Pat. No. 5,768,327

Inventor: Itzhak Pinto, et al.

Issued: Jun. 16, 1998

An object counter includes a feeding funnel having a frustroconical section, the narrow end of which is coupled to a substantially vertical feeding channel having a substantially rectangular cross section. A pair of linear optical sensor arrays are arranged along adjacent orthogonal sides of the feeding channel and a corresponding pair of collimated light sources are arranged along the opposite adjacent sides of the feeding channel such that each sensor in each array receives light the corresponding light source. Objects which are placed in the feeding funnel fall into the feeding channel and cast shadows on sensors in the arrays as they pass through the feeding channel. Outputs from each of the two linear optical arrays are processed separately, preferably according to various conservative criteria, and two object counts are thereby obtained. The higher of the two conservative counts is accepted as the accurate count and is displayed on a numeric display. In another embodiment, four sensor arrays and light sources are provided. The third and fourth sensor arrays and corresponding light sources are located downstream of the first and second arrays. The outputs of each of the sensor arrays are processed separately and the highest conservative count is accepted as the accurate count and is displayed on a numeric display.

U.S. Pat. No. 5,897,024

Inventor: Michael E. Coughlin, et al.

Issued: Apr. 27, 1999

A medicament dispensing cell for use in an automatic dispensing machine includes a housing defining a medicament storage section, a discharge section leading to an outlet, a passage between the sections, a rotatable platen and a dispensing assembly for dispensing medicament in single file from the storage section to the discharge section. A resilient, flexible bushing having outwardly extending fingers encloses the hub of the platen for conveying medicament through the passage. The platen includes a plurality of spirally configured conveying members defined on the surface thereof and the dispensing assembly includes a selectively adjustable passage wall for adjusting the breadth of the passage.

U.S. Pat. No. 6,006,946

Inventor: Jeffrey P. Williams

Issued: Dec. 28, 1999

A pill dispensing system includes a shelving unit in array form that holds a number of bulk containers, each holding a bulk amount of a pill to be dispensed. A computer controlled robot removes a selected bulk container and places it on a counter that also dispenses pills. The robot has an arm with a free end portion that can grip a bulk container or a single pill bottle to be filled. The robot is computer controlled to retrieve an empty pill bottle, place it on a label printing and applying unit, then place it next to the counter/dispenser to receive the selected number of selected prescription pills, then place the filled, labeled bottle on a conveyor.

U.K. Patent Number 2 198 957

Inventor: James Ian Brayshaw

Issued: Jun. 29, 1988

A disposable mouth to mouth resuscitator has inbuilt air inflation tube 1 and inbuilt air seals 4 and 3. The resuscitator can be used as a normal mouth to mouth resuscitator where contact with the patient's mouth is to be avoided.

While these inserts may be suitable for the purposes for which they were designed, they would not be as suitable for the purposes of the present invention, as hereinafter described.

SUMMARY OF THE PRESENT INVENTION

The present invention discloses a pill dispensing device and method in which the part of the device which comes into contact with the pills is disposable so as to prevent cross pill contamination. The device is a disposable, columnar insert comprised of a funnel-like ingress aperture for receiving the articles to be counted and dispensed, tapering to a constriction to limit the passageway and diverging out to a cylindrical tube that segregates the tablets/capsules from the counting/dispensing apparatus. The present invention also provides for an additional element wherein the egress aperture tapers to a smaller cylindrical aperture diametrically conforming to the aperture at the opposing distal end for dispensing the medication directly into a vial.

The present invention provides a disposable columnar insert comprised of a funnel-like ingress aperture for receiving the articles to be counted and dispensed, tapering to a constriction to limit the passageway and diverging out to a cylindrical tube that segregates the tablets/capsules during delivery to the counting/dispensing apparatus.

The present invention also provides for an additional element wherein the egress aperture tapers to a smaller cylindrical aperture diametrically conforming to an aperture at the opposing distal end for dispensing the medication, once counted, directly into a vial, thereby eliminating patients' unknown allergic symptoms caused by drug cross contamination.

A primary object of the present invention is to provide means for segregating an article to be counted and dispensed from the counting apparatus.

Another object of the present invention is to provide a disposable insert for an apparatus used to count and dispense articles.

Yet another object of the present invention is to provide a disposable insert that can be inserted into an article counting and dispensing apparatus housing.

Still yet another object of the present invention is to provide a disposable liner for a pill dispensing apparatus.

Another object of the present invention is to provide a disposable liner for a pill dispensing apparatus that will prevent cross contamination of medication.

Yet another object of the present invention is to provide a disposable liner comprised of a cylindrical device tapering to a constriction and diverging out into a funnel-like aperture at one distal end.

Still yet another object of the present invention is to provide a disposable liner having an additional element wherein the other distal end constricts to a smaller cylindrically egress aperture for said medication.

Additional objects of the present invention will appear as the description proceeds.

The present invention overcomes the shortcomings of the prior art by providing a disposable columnar insert comprised of a funnel-like ingress aperture for receiving the articles to be counted and dispensed, tapering to a constriction to limit the passageway and diverging out to a cylindrical tube that segregates the tablets/capsules from the counting/dispensing apparatus.

The present invention also provides for an additional element wherein the egress aperture tapers to a smaller cylindrical aperture diametrically conforming to an aperture at the opposing distal end for dispensing the medication directly into a vial.

The present invention also provides process improvement using the disposable chute liner on drug filling. The present invention protects against the potential cross contamination that generally occurs during filling, counting and dispensing of a medication, with the debris/dust of previously dispensed medications. Unlike other inventions (such as U.S. Pat. Nos. 4,018,358 and 5,897,024), this disposable chute liner will ensure that no debris/dust will be scattered in the surroundings during the filling process. All medications (the pill itself includes the debris/dust) using the disposable chute liner are dispensed directly into the patient's medication vial. After each filling of the medication is completed, the disposable chute liner will be discarded thereby preventing the potential for cross drug contamination.

Because of the improvement in the filling process, it is further claimed that using this invention of the disposable chute liner can greatly improve and reduce the potential for cross drug contamination. This resulting will ultimately help to resolve the unknown allergic symptoms caused by potential contamination in these new pharmacy environments. The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
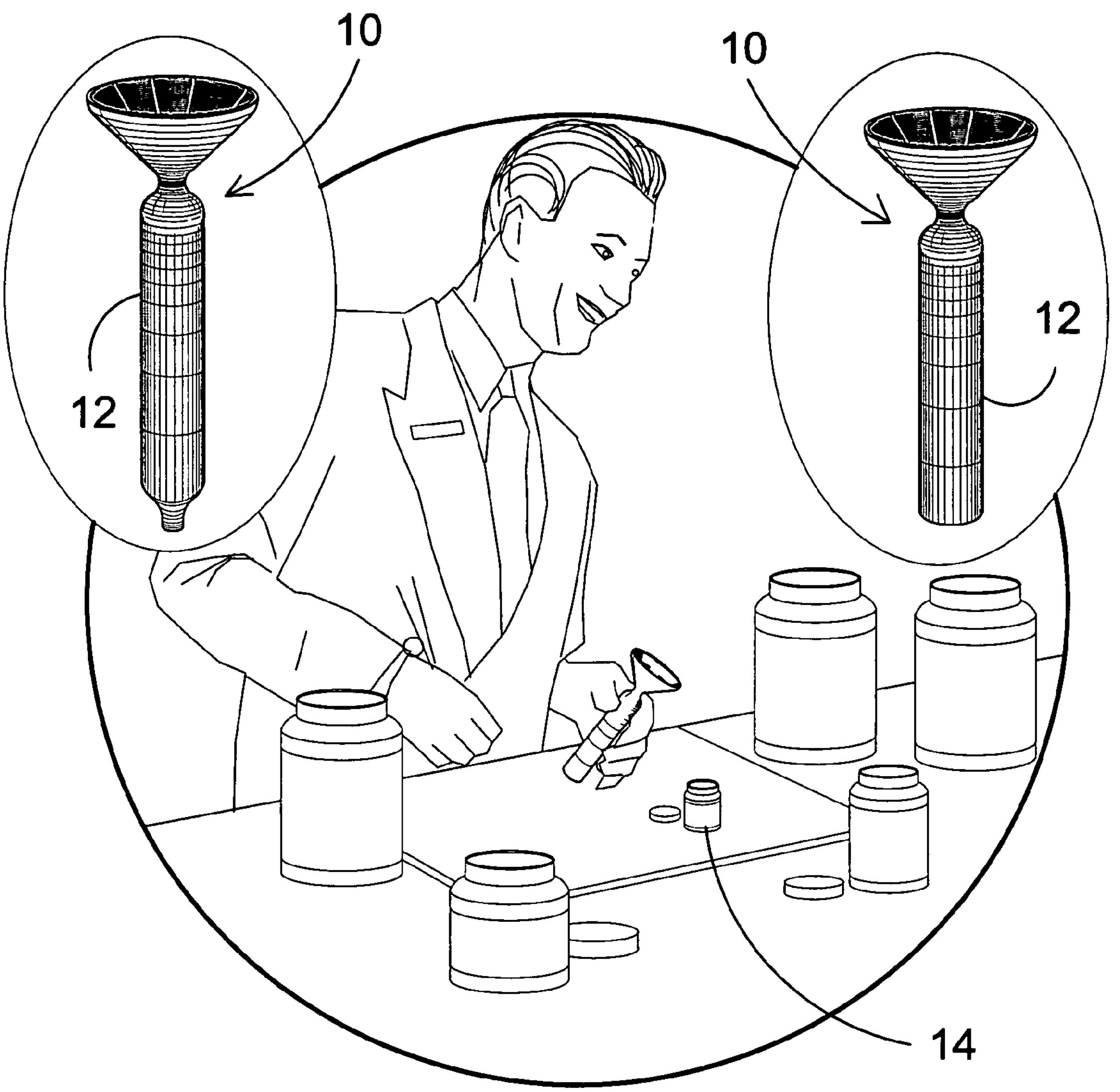
FIG. 1 is an illustrative view of the present invention in use.

With regard to reference numerals used, the following numbering is used throughout the drawings.

10 present invention
12 chute
14 medication vial
16 ingress aperture
18 constriction
20 tube
22 pill dispensing device
24 pill dispensing device inlet aperture
26 egress aperture

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a disposable chute liner 12 for directing pills into medication prescription vials 14 and comprises an apparatus constructed of a low density polyethylene or polypropylene (or other) materials. The disposable pill chute 12 can be widely used as a working unit with any pill dispensing device having built-in electronics counting capabilities that exist on the market today. The present invention 10 provides an effective way to prevent cross contamination with the debris of previously used medications. Contamination generally occurs at the time of filling, counting and dispensing all prescription drugs by pharmacy professionals.

Figure 2:
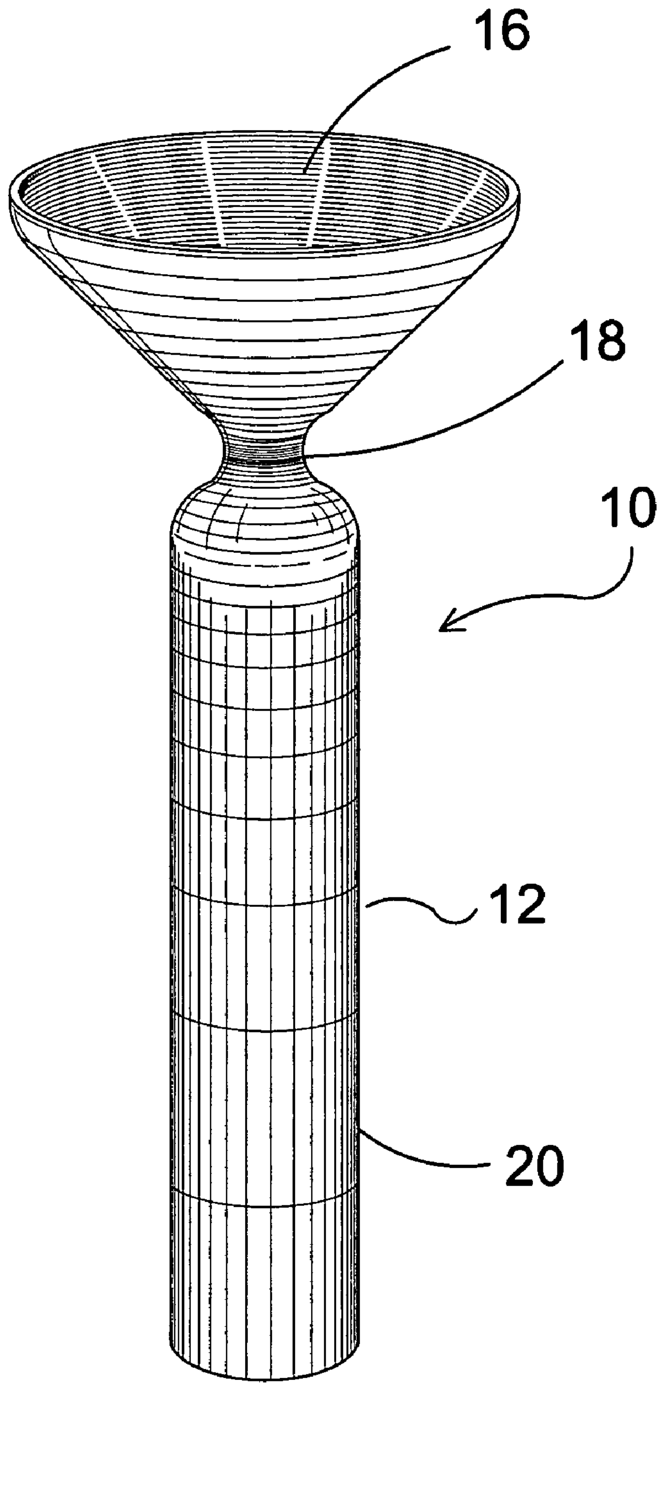
FIG. 2 is a perspective view of the present invention.

Turning to FIG. 2, shown therein is a perspective view of the present invention 10. Shown is a disposable columnar insert comprised of a funnel-like ingress aperture 16 for receiving the articles to be counted and dispensed, tapering to a constriction 18 to limit the passageway and diverging out to a cylindrical tube 20 that segregates the tablets/capsules during delivery to the counting/dispensing apparatus.

Figure 3:
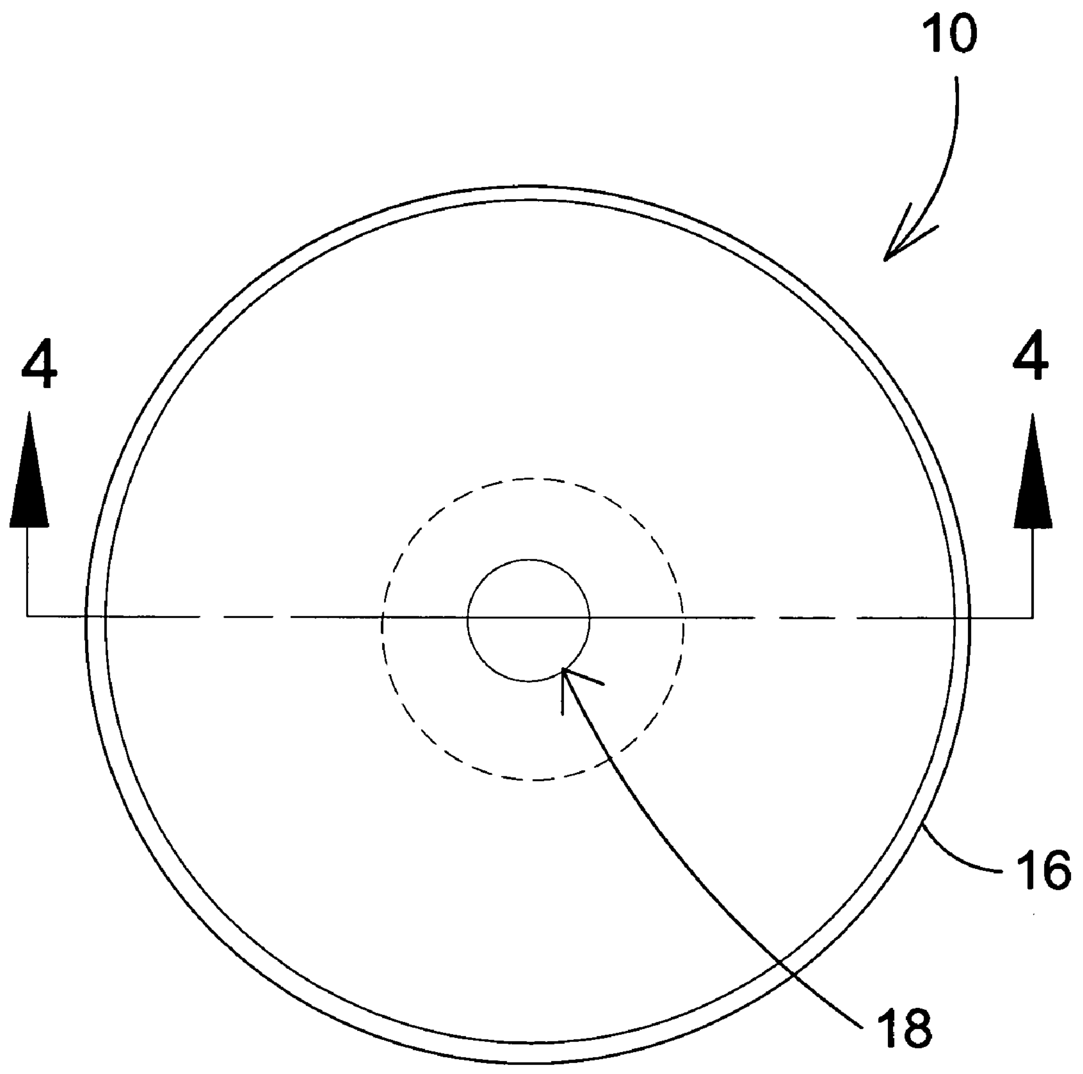
FIG. 3 is a top view of the present invention.

Turning to FIG. 3, shown therein is a top view of the present invention 10. Shown is a top view of the disposable columnar insert having a funnel-like ingress aperture 16 for receiving the articles to be counted and dispensed tapering to a constriction 18 to limit the passageway during delivery to the counting/dispensing apparatus.

Figure 4:
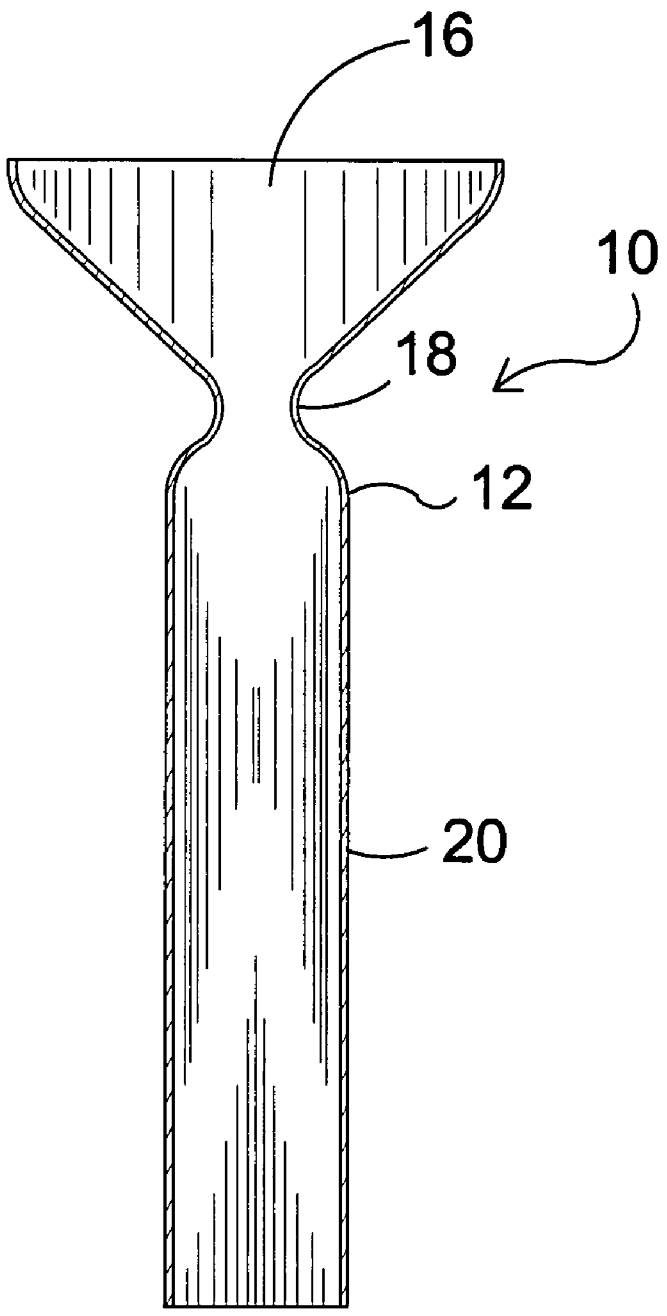
FIG. 4 is a sectional view of the present invention.

Turning to FIG. 4, shown therein is a sectional view of the present invention 10. Shown is a sectional view of the disposable columnar chute or insert 12 of the present invention 10 having means for receiving 16 a plurality of articles to be counted and dispensed and means for limiting the passage 18 of the articles and means for segregating 20 the articles from the counting apparatus.

Figure 5:
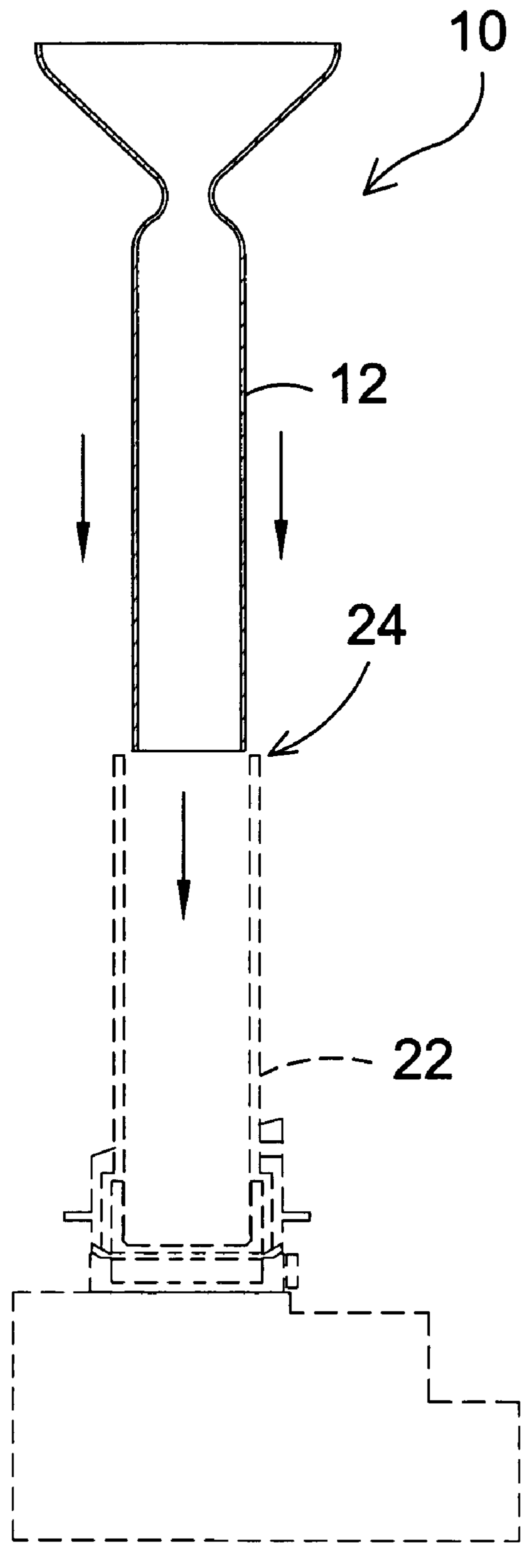
FIG. 5 is a sectional view of the present invention being inserted within a pill dispensing device.

Turning to FIG. 5, shown therein is a sectional view of the present invention 10 being inserted within a pill dispensing device 22. Shown is a sectional view of the disposable chute liner 12 for directing pills into medication vials comprised of a device for receiving, constricting and segregating articles to be counted and dispensed from the apparatus performing the counting and dispensing. The device 10 is inserted into the existing apparatus receiving aperture 24 providing means for segregating the tablets/capsules from the counting/dispensing apparatus and is disposed of when the prescription has been filled thereby preventing the potential for cross drug contamination.

Figure 6:
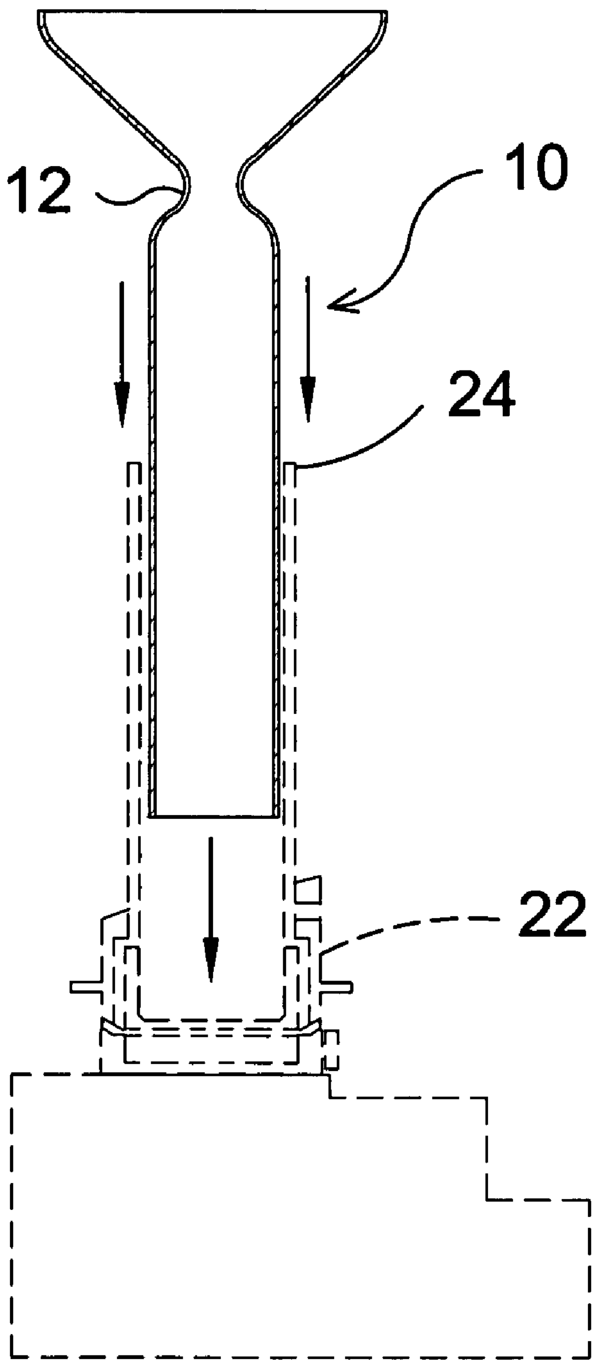
FIG. 6 is a sectional view of the present invention partially inserted into a pill dispensing device.

Turning to FIG. 6, shown therein is a sectional view of the present invention 10 partially inserted into a pill dispensing device 22. Shown is a sectional view of the present invention 10 disclosing a disposable chute liner 12 for directing pills into medication vials being inserted into the existing receiving aperture 24 of a tablet/capsule counting/dispensing device 22. In the preferred embodiment the device 10 is constructed of a low density polyethylene or polypropylene or other materials and is used in conjunction with any pill dispensing device having built-in electronic counting capabilities that exists on the market today. The device provides an effective way of preventing drug cross contamination, generally occurring during filling, counting and dispensing of a medication, with the debris of previously dispensed medications. Once used the insert 10 is disposed of to prevent cross contamination with the subsequent medications.

Figure 7:
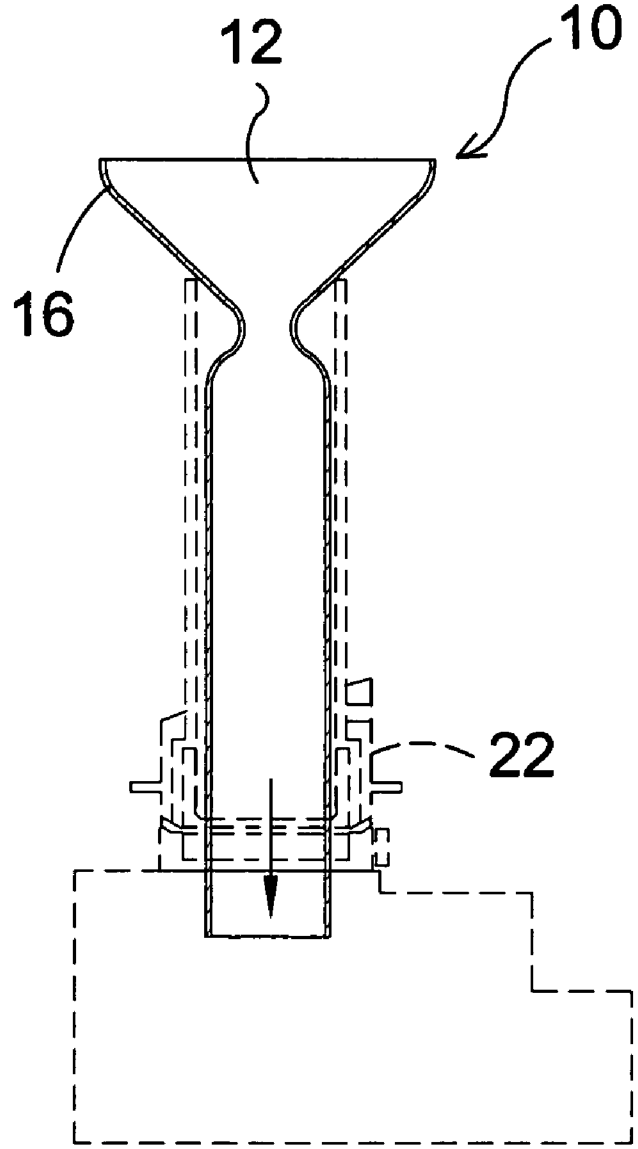
FIG. 7 is a sectional view of the present invention fully inserted into a pill dispensing device.

Turning to FIG. 7, shown therein is a sectional view of the present invention 10 fully inserted into a pill dispensing device 22. Shown is a sectional view of the disposable chute liner 12 seated within an article counting/dispensing apparatus 22 for directing pills into medication vials. The device 10 receives a plurality of tables/capsules into a funnel-like aperture 16, restricts their passage and segregates the articles to be counted and dispensed from the apparatus performing the counting and dispensing. Once the prescription filling process is completed the disposable chute liner 10 is discarded thereby preventing the potential for cross drug contamination.

Figure 8:
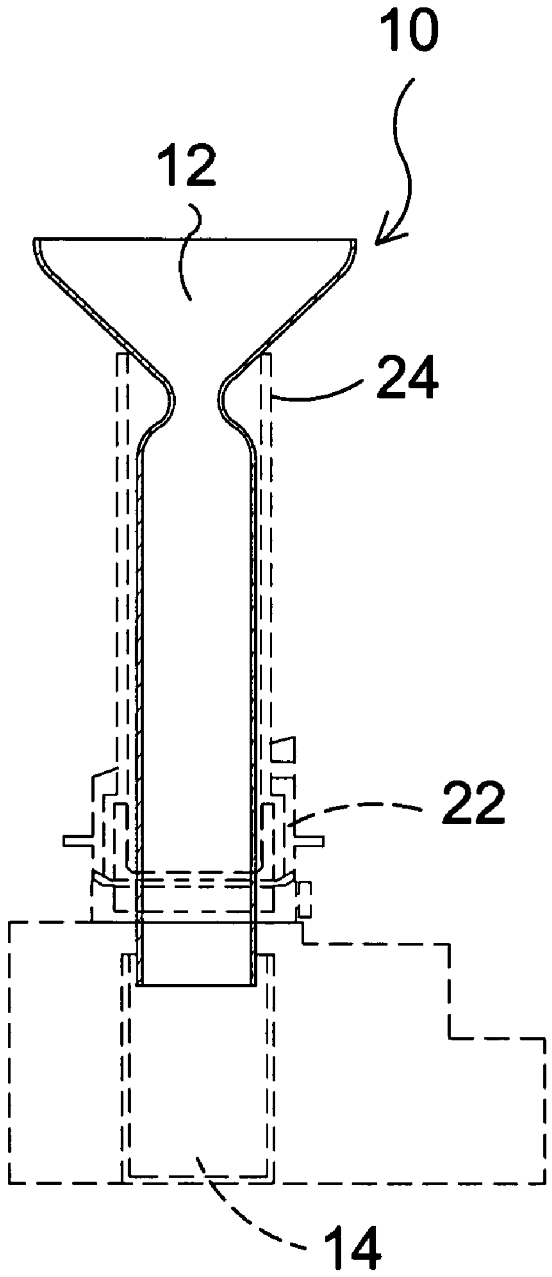
FIG. 8 is a sectional view of the present invention fully inserted into a pill dispensing device and having a prescription vial below it.

Turning to FIG. 8, shown therein is a sectional view of the present invention 10 fully inserted into a pill dispensing device 22 and having a prescription vial 14 below it. Shown is a sectional view of the disposable chute liner 12 for directing pills into medication vials in communication with the vial 14. The device 10 receives, constricts passage, and segregates the articles to be counted and dispensed from the apparatus 22 performing the counting and dispensing. The device 10 is inserted into the existing apparatus receiving aperture 24 providing means for segregating the tablets/capsules from the counting/dispensing apparatus 22 and is disposed of when the prescription has been filled thereby preventing the potential for cross drug contamination.

Figure 9:
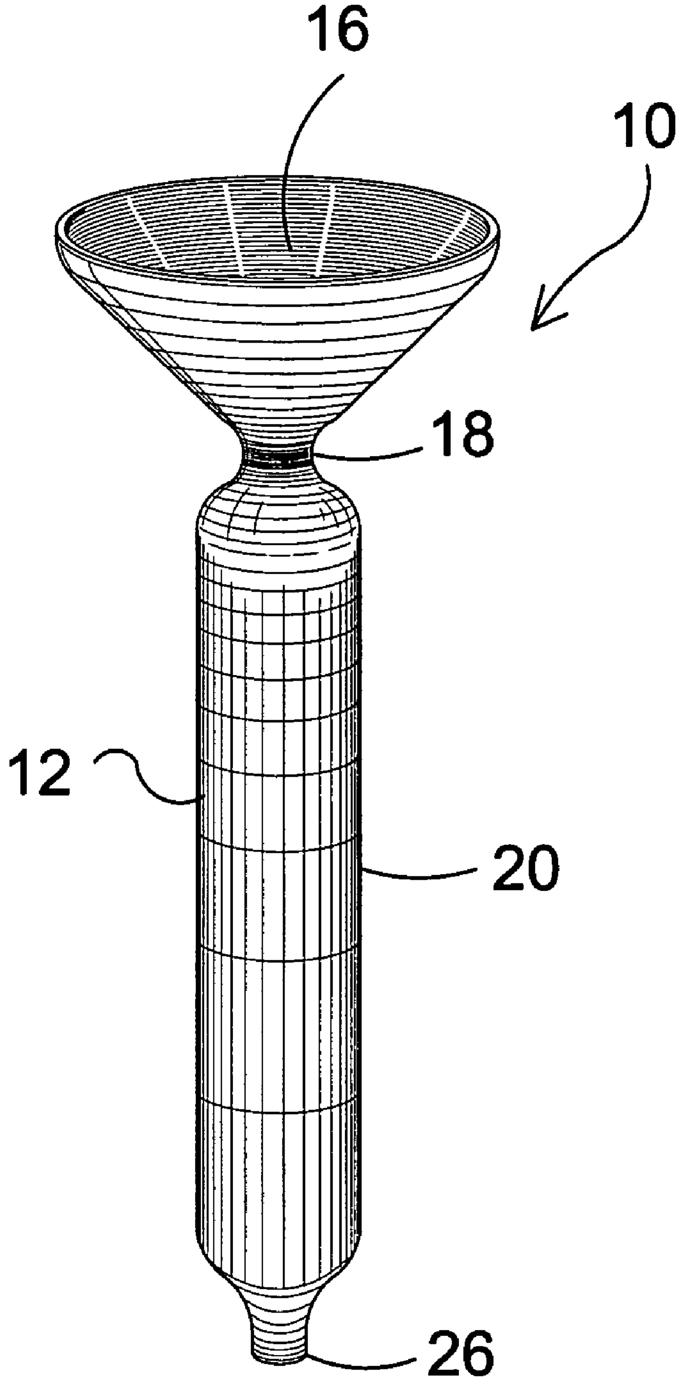
FIG. 9 is a perspective view of an alternate shape of the present invention.

Turning to FIG. 9, shown therein is a perspective view of an alternate shape of the present invention 10. Shown is the present invention 10 providing an additional element in the form of a constricted egress 26. The device 10 is a disposable columnar liner 12 comprised of a funnel-like ingress aperture 16 for receiving the articles to be counted and dispensed, tapering to a constriction 18 to limit the passageway and diverging out to a cylindrical tube 20 that segregates the tablets/capsules during delivery to the counting/dispensing having an egress aperture tapering to a smaller cylindrical aperture 26 diametrically conforming to an aperture at the opposing distal end for dispensing the medication directly into a vial.

Figure 10:
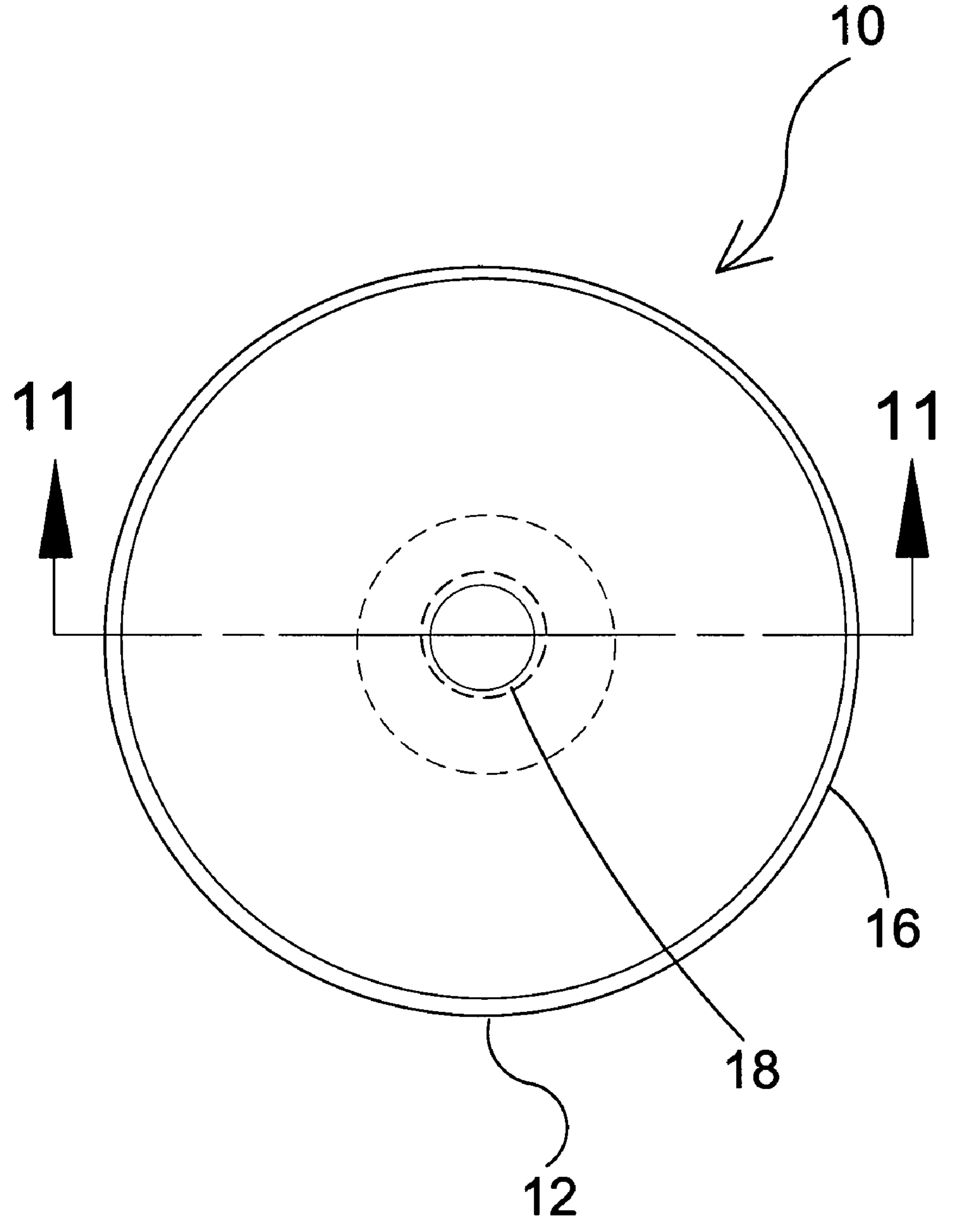
FIG. 10 is a top view of an alternate shape of the present invention.

Turning to FIG. 10, shown therein is a top view of an alternate shape of the present invention 10. Shown is a top view the alternate disposable columnar insert 12 having a funnel-like ingress aperture 16 for receiving the articles to be counted and dispensed, tapering to a constriction 18 to limit the passageway during delivery to the counting/dispensing apparatus.

Figure 11:
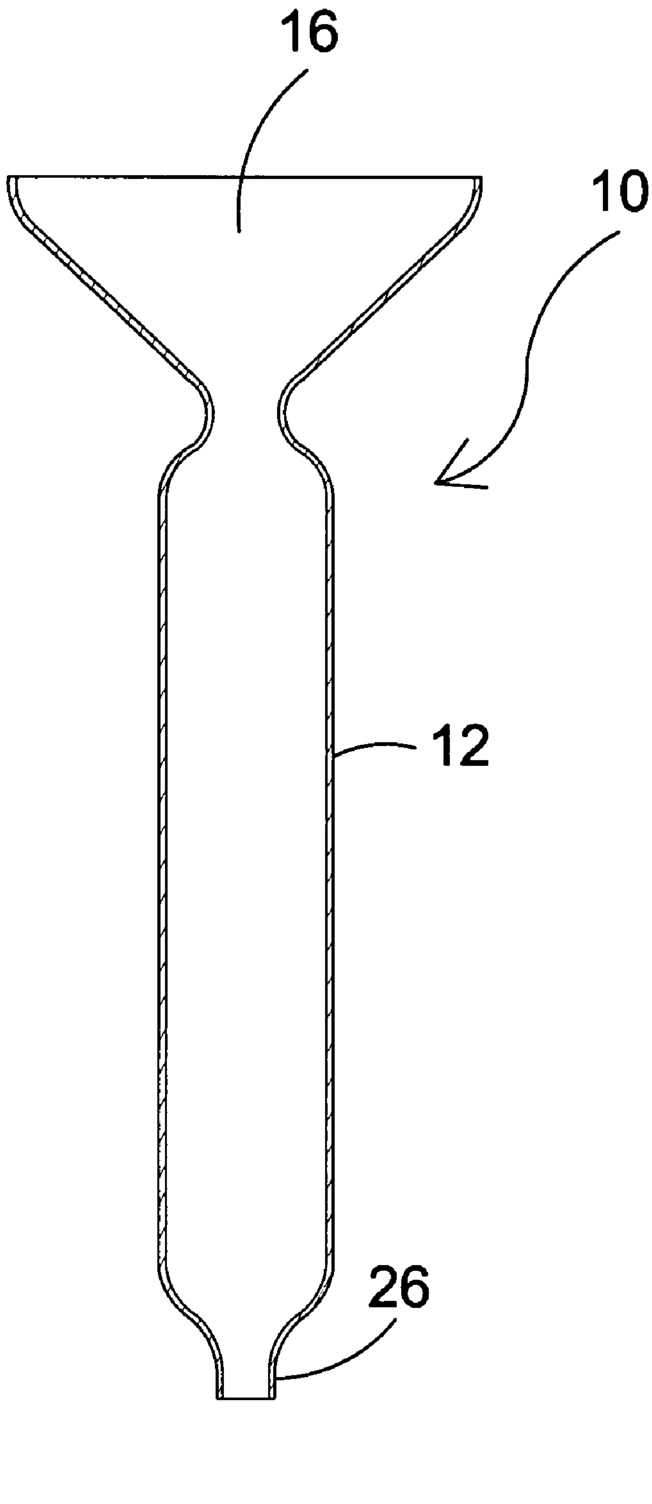
FIG. 11 is a sectional view of an alternate shape of the present invention.

Turning to FIG. 11, shown therein is a sectional view of an alternate shape of the present invention 10. Shown is a sectional view of the alternate disposable columnar insert 12 of the present invention 10 having means for receiving 16 a plurality of articles to be counted and dispensed and means for limiting the passage of the articles and means for segregating the articles from the counting apparatus along with egress aperture 26.

Figure 12:
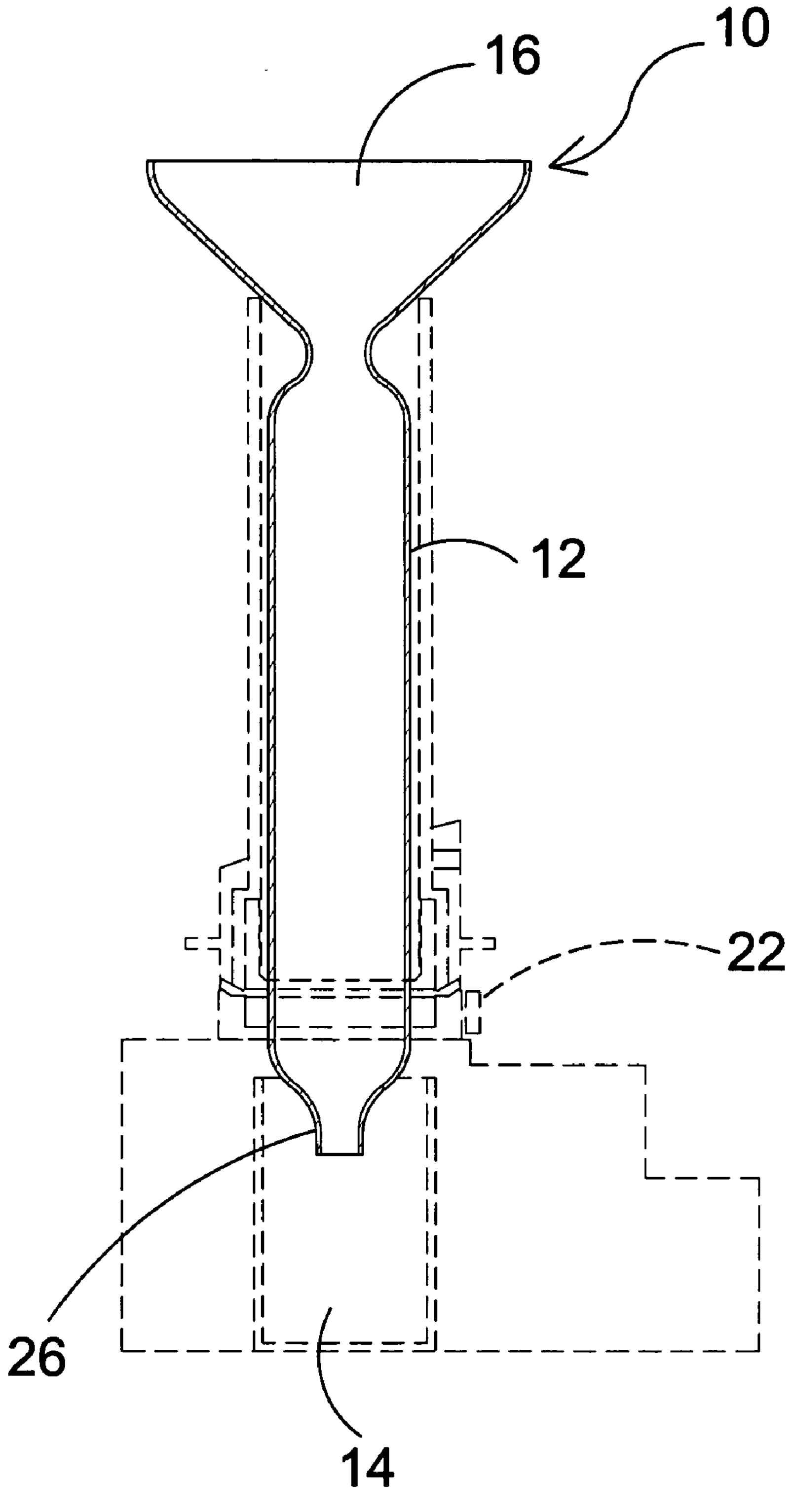
FIG. 12 is a sectional view of an alternate shape of the present invention inserted within a pill-dispensing device and having a prescription vial below it.

Turning to FIG. 12, shown therein is a sectional view of an alternate shape of the present invention 10 inserted within a pill dispensing device 22 and having a prescription vial 14 below it. Shown is a sectional view of the alternate disposable chute liner seated within an article counting/dispensing apparatus 22, for directing pills into medication vials. The device 16 receives a plurality of tables/capsules into a funnel-like aperture 16, restricts their passage, segregates the articles and limits the diametric egress aperture 26 for the tablets being counted and dispensed. Once the prescription filling process is completed the disposable chute liner 12 is discarded thereby preventing the potential for cross drug contamination.

I claim:

1. A disposable pill dispensing chute, comprising:

a) an elongated cylindrical body having first and second opposing ends to permit pills to pass from the first end to the second end;

b) a funnel inlet having first and second opposing ends, being disposed on said first end of said cylindrical body, wherein said second end of said funnel inlet is joined to said first end of said cylindrical body, wherein said first end of said funnel inlet is enlarged for receiving pills therein, wherein said first end of said funnel inlet tapers toward said second end of said funnel inlet;

c) a narrowed throat section connecting said second end of said funnel inlet to said first end of said cylindrical body and forming a smooth transitional curvature surface both inside and outside of said chute from said funnel inlet to said cylindrical body, wherein said throat section has a smaller diameter than said cylindrical body to permit the pills to be segregated; and d) an outlet being disposed on said second end of said cylindrical body to permit pills to exit from the cylindrical body, wherein said funnel inlet, said cylindrical body and said narrowed throat section form a unitary member.

2. The pill dispensing chute of claim 1, further comprising an egress aperture being disposed on said second end of said cylindrical body, wherein said egress aperture has a smaller diameter than said cylindrical body for dispensing medication directly into a vial.

3. The pill dispensing chute of claim 2, wherein said egress aperture has a diameter substantially the same as the diameter of said constriction.

4. The pill dispensing chute of claim 3, wherein the pill dispensing chute comprises polyethylene.

5. A disposable pill dispensing chute for use with and in combination with a pill dispensing device for directing and counting pills for a medication vial, comprising:

a) said dispensing chute being a disposable elongated cylindrical body having first and second opposing ends to permit pills to pass from the first end to the second end, a funnel inlet having first and second opposing end, being disposed on said first end of said cylindrical body, wherein said second end of said funnel inlet is joined to said first end of said cylindrical body, where said first end of said funnel inlet is enlarged for receiving pills therein, wherein said first end of said funnel inlet tapers toward said second end of said funnel inlet, and a narrowed throat section connecting said second end of said funnel inlet to said first end of said cylindrical body and forming a smooth transitional curvature surface both inside and outside of said chute from said funnel inlet to said cylindrical body, wherein said funnel inlet, cylindrical body and said narrowed throat section form a unitary member, and wherein said narrowed throat section has a smaller diameter than said cylindrical body to permit the pills to be segregated;

b) an outlet being disposed on said second end of said cylindrical body to permit pills to exit from the cylindrical body; and c) a dispensing device having a receiving aperture for receiving said dispensing chute; wherein said dispensing chute extends through said receiving aperture of said dispensing device for discharging said pills directly into a medication vial disposed below said receiving aperture.

* * * * *